United States Patent
Iwamoto et al.

(10) Patent No.: US 7,318,592 B2
(45) Date of Patent: Jan. 15, 2008

(54) MOTORCYCLE STEERING DAMPER

(75) Inventors: Tadamitsu Iwamoto, Shizuoka (JP); Takafumi Fujimori, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 428 days.

(21) Appl. No.: 10/504,459

(22) PCT Filed: Feb. 20, 2003

(86) PCT No.: PCT/JP03/01884

§ 371 (c)(1),
(2), (4) Date: Aug. 11, 2004

(87) PCT Pub. No.: WO03/070551

PCT Pub. Date: Aug. 28, 2003

(65) Prior Publication Data

US 2005/0151341 A1 Jul. 14, 2005

(30) Foreign Application Priority Data

Feb. 20, 2002 (JP) .............................. 2002-043496

(51) Int. Cl.
  *B62D 7/22* (2006.01)
  *B62K 21/08* (2006.01)
  *F16K 15/00* (2006.01)
  *F16K 17/26* (2006.01)
  *F16K 31/08* (2006.01)

(52) U.S. Cl. .................. 280/90; 137/493.9; 137/519.5; 251/65; 280/89; 280/272

(58) Field of Classification Search ............. 188/267.1, 188/267.2, 318; 280/89, 90, 272
See application file for complete search history.

(56) References Cited

U.S. PATENT DOCUMENTS

| 398,111 | A | * | 2/1889 | Abbot et al. ................. 137/515 |
| 1,628,811 | A | | 5/1927 | Shultz et al. |
| 1,699,143 | A | * | 1/1929 | Hill .......................... 236/44 R |
| 1,868,970 | A | * | 7/1932 | Collins ....................... 123/499 |
| 1,873,100 | A | | 8/1932 | Allen |
| 2,914,085 | A | * | 11/1959 | Mercier ....................... 137/514 |
| 5,853,184 | A | * | 12/1998 | Lofgren et al. .......... 280/242.1 |

(Continued)

FOREIGN PATENT DOCUMENTS

DE         2540107 A  *  3/1977

(Continued)

*Primary Examiner*—Anne Marie Boehler
*Assistant Examiner*—Daniel Yeagley
(74) *Attorney, Agent, or Firm*—Hogan & Hartson LLP

(57) ABSTRACT

According to the invention, there is provided a steering damper (10) in which the interior of a cylinder (12) is divided into two oil chambers (A), (B) by a piston (14) which slides in the cylinder (12) as a steering operation takes place, an oil hole (15) is formed in the piston (14) for providing a communication between the two oil chambers (A), (B) and a bypass passageway (16) is provided for allowing oil in one (A or B) of the oil chambers to flow into the other oil chamber (B or A) by bypassing the oil hole (15), the motorcycle steering damper being characterized in that a subsidiary chamber (17) is defined at an intermediate position along the length of the bypass passageway (16), and in that a check ball (18) is provided in the subsidiary chamber (17).

3 Claims, 5 Drawing Sheets

U.S. PATENT DOCUMENTS 6,036,210 A * 3/2000 Lee .................... 280/250

FOREIGN PATENT DOCUMENTS

| | | | |
|---|---|---|---|
| DE | 2710651 A * | 9/1978 | |
| FR | 2819778 A1 * | 7/2002 | |
| JP | 61-21673 | 2/1986 | |
| JP | 64-4633 * | 2/1989 | |
| JP | 5-201377 | 8/1993 | |
| JP | 06099873 A * | 4/1994 | |
| JP | 9-132189 | 5/1997 | |
| JP | 10-325448 | 8/1998 | |
| JP | 2000-179721 | 6/2000 | |
| JP | 2001301682 A * | 10/2001 | |
| JP | 2004026092 A * | 1/2004 | |

* cited by examiner

MOTORCYCLE STEERING DAMPER

TECHNICAL FIELD

The present invention relates to a motorcycle steering damper for suppressing vibrations at a front wheel system due to disturbance.

BACKGROUND ART

When the motorcycle is running at high speed, the grounding load at a front wheel system of a motorcycle decreases due to lift. In the event that a large disturbance is imparted to the front wheel system from a road surface in such a condition, the vibration of the front wheel system increases, thereby damaging the driving stability.

Then, there is provided a proposal in which a steering damper is provided between a steering system member such as a steering bracket and a vehicle body frame for absorbing disturbance from the road surface by virtue of a damping force generated on the steering damper so provided to thereby suppress the vibration of the front wheel system (for example, refer to JP-A-2000-301680).

The steering damper is constructed such that the interior of a cylinder is divided into two oil chambers by a piston which slides in the cylinder as a steering operation takes place, an oil hole (an orifice) is formed in the piston for providing a communication between the two oil chambers, and a bypass passageway is provided for allowing oil in one of the oil chambers to flow into the other oil chamber by bypassing the oil hole, whereby an electromagnetic valve is controlled based on the behaviors of the vehicle which are affected by vehicle speed, steering angle and load which are detected by sensors so that the bypass passageway is closed by the electromagnetic valve so as to increase quickly the damping force to thereby suppress the vibration of the front wheel system.

However, since the conventional steering damper needs sensors for detecting the vehicle speed and steering angle, so that the electromagnetic valve and the like are controlled to operate based on detection signals from the sensors, there are caused problems that the number of components is increased to thereby call for an increase in costs and that highly reliable operations are difficult to be secured due to a delay in control.

The invention was made in view of the problems, and an object thereof is to provide a motorcycle steering damper which requires no electrical control but ensures mechanical operations and which can suppress the vibration of the front wheel system due to disturbance while ensuring the decrease in cost by decreasing the number of components and high reliability.

DISCLOSURE OF THE INVENTION

To attain the object, according to a first aspect of the invention, there is provided a motorcycle steering damper in which the interior of a cylinder is divided into two oil chambers by a piston that slides in the cylinder as a steering operation takes place, and a passageway for providing a communication between the two oil chambers is provided in a portion other than the piston, the motorcycle steering damper being characterized in that a subsidiary chamber is defined at an intermediate position along the length of the passageway, and in that a check ball is provided in the subsidiary chamber, the check ball is adapted to move so as to reduce the cross-sectional area of the passageway when a steering speed exceeds a predetermined value and a differential pressure between the two oil chambers reaches or exceeds a certain value.

According to a second aspect of the invention, there is provided a motorcycle steering damper as set forth in the first aspect of the invention, characterized in that an oil hole is provided in the piston for providing a communication between the two oil chambers.

According to a third aspect of the invention, there is provided a motorcycle steering damper as set forth in the first aspect of the invention, characterized in that a slit is formed in a surface of the passageway on which the check ball is seated.

According to a fourth aspect of the invention, there is provided a motorcycle steering damper as set forth in the first, second or third aspect of the invention, characterized in that a holding device is provided which holds the check ball at a neutral position where the bypass passageway is not closed by the check ball in a state in which the differential pressure is smaller than the certain value.

According to a fifth aspect of the invention, there is provided a motorcycle steering damper as set forth in the fourth aspect of the invention, characterized in that the holding device is made up of a concavely curved surface or a magnet formed on a floor of the subsidiary chamber.

According to a sixth aspect of the invention, there is provided a motorcycle steering damper as forth in the fourth aspect of the invention, characterized in that the holding device is made up of a spring for holding the check ball in a neutral state.

Consequently, according to the first to third aspects of the invention, since a mechanical construction is adopted in which, when the steering speed exceeds the normal range, whereby the differential pressure between the two oil chambers in the cylinder reaches or exceeds the certain value, the check ball is moved by virtue of the differential pressure to thereby reduce the cross-sectional area of the passageway, the necessity of a sensor or electrical control is obviated, so that the occurrence of vibrations at the front wheel system due to disturbance can be suppressed while attempting to reduce the production costs by decreasing the number of components involved and to secure high reliability which results from the entrainment of no delay in control.

In addition, according to the fourth to sixth aspects of the invention, since the check ball is held at the neutral position in the state in which the differential pressure between the two chambers is smaller than the certain value, there is no case where the check ball is moved to close the passageway by vibrations, or the inclination of the vehicle body or centrifugal force which takes place or is generated during the cornering, whereby a smooth steering operation can be provided without any resistance in normal driving conditions.

BRIEF DESCRIPTION OF THE DRAWINGS

FIG. 6 is a cross-sectional view of a steering damper according to another aspect of the invention.

BEST MODE FOR CARRYING OUT THE INVENTION

Embodiments of the invention will be described below based on the accompanying drawings.

Figure 1:
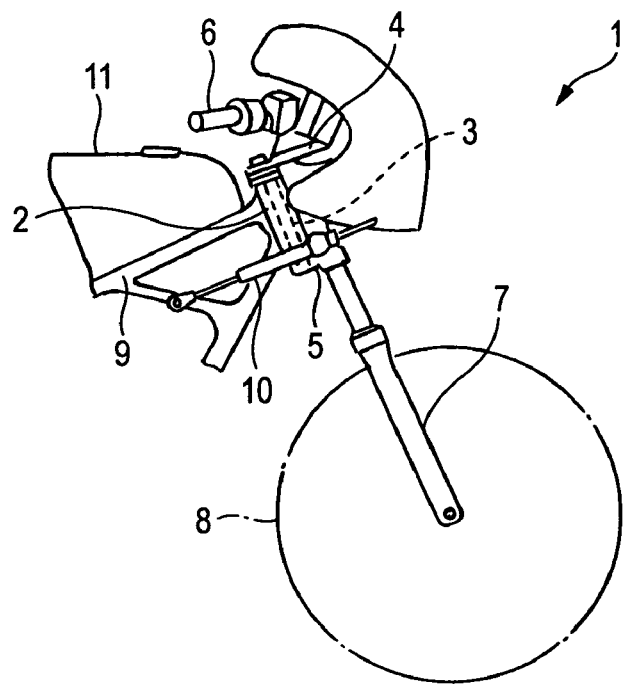
FIG. 1 is a right side view of a front part of a motorcycle provided with a steering damper according to the invention.
Figure 2:
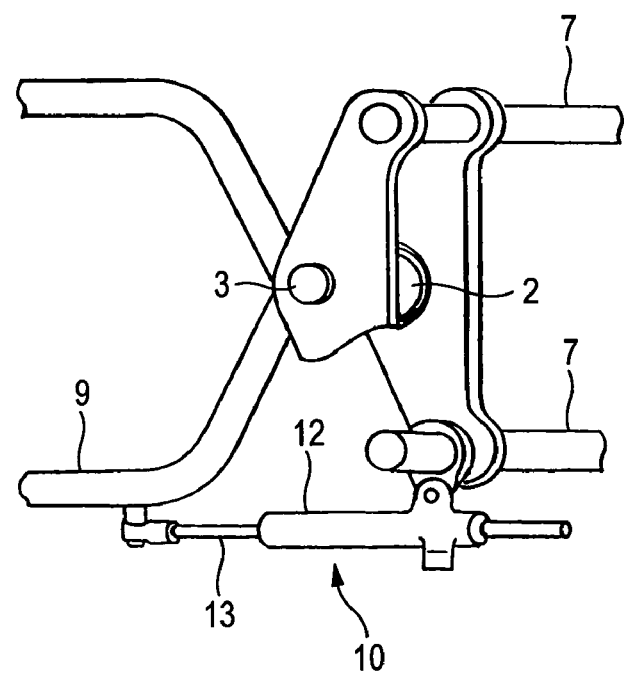
FIG. 2 is a plan view of the front part of the motorcycle illustrating a construction in which the steering damper according to the invention is arranged.

FIG. 1 is a right side view of a front part of a motorcycle provided with a steering damper according to the invention, and FIG. 2 is a plan view of the front part of the motorcycle illustrating a construction in which the steering damper is arranged.

In a motorcycle 1 shown in FIG. 1, reference numeral 2 denotes a head pipe located at an upper portion of the front of a vehicle body, and a steering shaft 3 is passed through and supported rotatably in the head pipe 2 and an upper bracket 4 and a lower bracket 5 are attached to the steering shaft 3 at upper and lower ends thereof, respectively. Then, a handlebar 6 is attached to the upper bracket 4 and an upper portion of a front fork 7 is passed and supported between the upper bracket 4 and the lower bracket 5, a front wheel 8 being rotationally supported at a lower portion of the front fork 7.

In addition, a vehicle body frame 9 is provided to extend from the head pipe 2 to the rear of the vehicle body, and a steering damper 10 according to the invention is provided on the right-hand side of the vehicle body in such a manner as to be interposed between the vehicle body frame 9 and the lower bracket 5. Note that, in FIG. 1, reference numeral 11 denotes a fuel tank.

Incidentally, as shown in FIG. 2, the steering damper 10 according to the invention is constructed to incorporate a cylinder 12 and a piston rod 13 which is passed through the interior of the cylinder 12 in such a manner as to move in response to an impact, and the cylinder 12 is attached to a right-hand side of the lower bracket 5, whereas the piston rod 13 is attached to a right-hand side of the vehicle body frame 9 at one end thereof.

Figure 3:
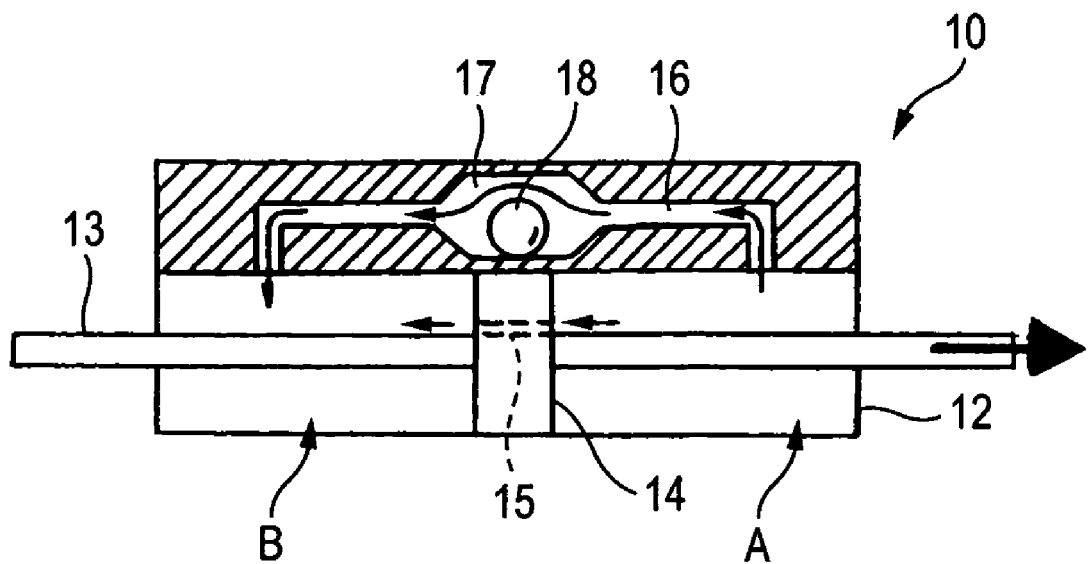
FIG. 3 is a cross-sectional view of the steering damper according to the invention (when a bypass passageway is opened)
Figure 4:
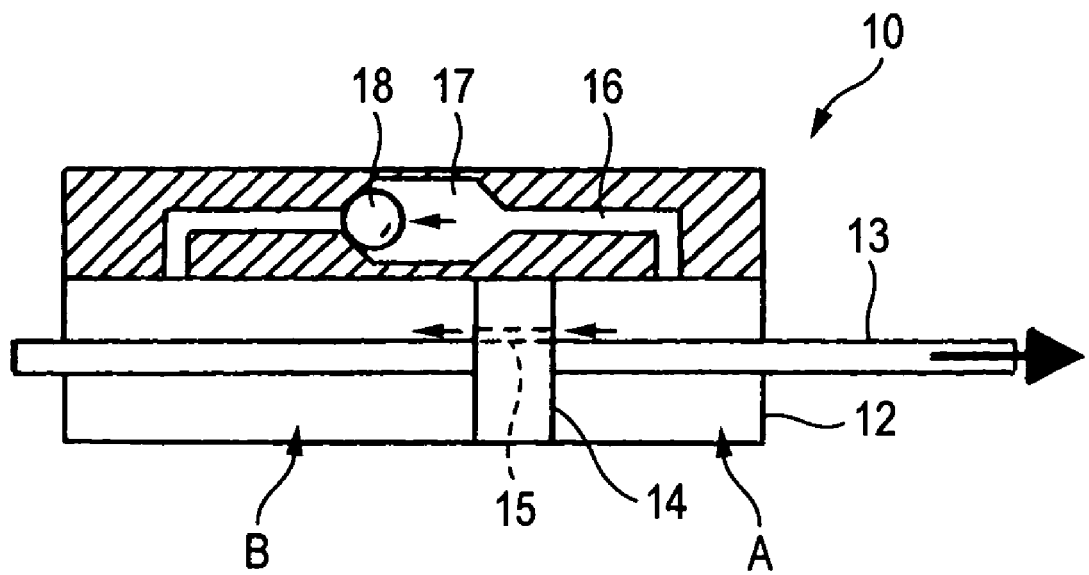
FIG. 4 is a cross-sectional view of the steering damper according to the invention (when a bypass passageway is closed)
Figure 5:
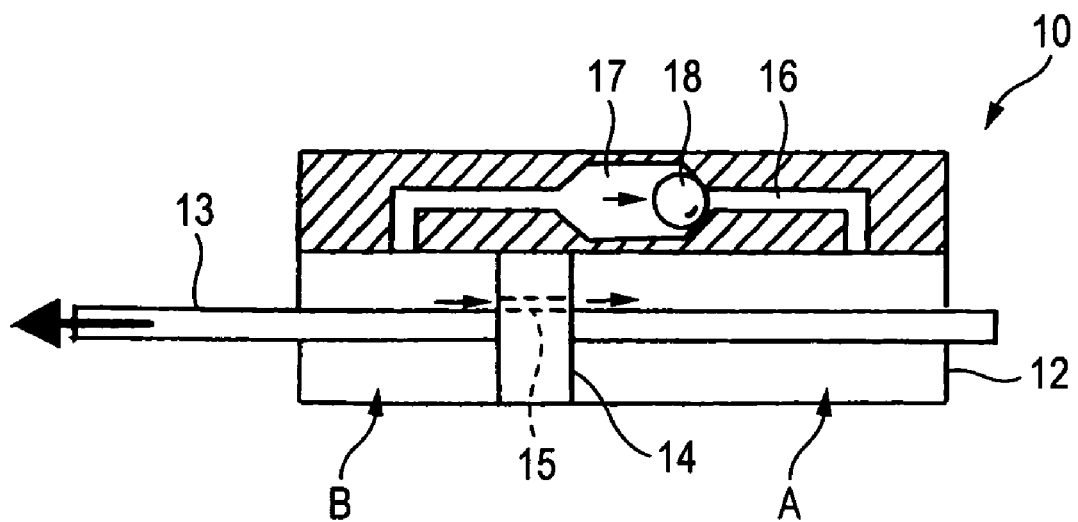
FIG. 5 is a cross-sectional view of the steering damper according to the invention (when a bypass passageway is closed)

Here, the construction and function of the steering damper 10 will be described based on FIGS. 3 to 5. Note that FIGS. 3 to 5 are explanatory cross-sectional views of the steering damper.

In the steering damper 10 according to the invention, a piston 14 fittingly inserted into the cylinder 12 in such a manner as to slide therein is attached to the piston rod 13 which is passed through the inside of the cylinder 12, and oil chambers A, B are defined in the cylinder 12 by the piston 14, oil being fill in the oil chambers A, B. Then, an oil hole (orifice) 15 having a small diameter is opened in the piston 14 for providing a communication between the oil chambers A, B.

In addition, a bypass passageway 16 is formed in a side of the cylinder 12 for allowing oil in one A (or B) of the oil chambers to flow into the other oil chamber B (or A) by bypassing the oil hole 15 formed in the piston 14, and a subsidiary chamber 17 is defined in the bypass passage 16 at an intermediate position along the length thereof. Then, a metallic check ball 18 is accommodated in the interior of the subsidiary chamber 17. The metallic check ball 18 is adapted to move to close the bypass passageway 16 when the steering speed exceeds a predetermined value and a differential pressure between the two oil chambers A, B reaches or exceeds a certain value.

Next, the function of the steering damper 10 having the above construction will be described.

When the rider performs a steering operation of rotating the handlebar 6 shown in FIG. 1 to the left or right, the two brackets 4, 5, the front fork 7 and the front wheel 8 rotate to the left or right about the steering shaft 3 together with the handlebar 6, whereby the motorcycle 1 is turned to the left or right. A distance between the lower bracket 5 and the vehicle body frame 9 varies by virtue of the steering operation, and therefore, the steering damper 10 is caused to extend or contract accordingly.

Namely, in a case where the rider rotates the handlebar 6 to, for example, the right, the piston rod 13 and the piston 14 attached thereto slide in a rightward direction as viewed in FIG. 3 (a direction indicated by an arrow in the drawing) in the steering damper 10, and on the contrary, in a case where the rider rotates the handlebar 6 to the left, the piston rod 13 and the piston 14 slide in a leftward direction as viewed in FIG. 3 in the steering damper 10.

Thus, in a case where a speed at which the front wheel system vibrates transversely due to disturbance from the ground (hereinafter, referred to as the steering speed) resides within a normal range and the sliding speed of the piston 14 within the cylinder 12 also resides within a normal range at low and intermediate running speeds, the differential pressure between the two oil chambers A, B is so small that the check ball 18 within the subsidiary chamber 17 does not move by virtue of the differential pressure, and, as shown in FIG. 3, the check ball 18 is located at a neutral position, wherein the bypass passageway 16 is in an opened state, whereby a communication is being provided between the two oil chambers A, B.

Consequently, in a case where the piston 14 moves within the cylinder 12 to the right as viewed in FIG. 3 as has been described before in a state in which the check ball 18 is at the neutral position as has been described above, oil in the oil chamber A passes mainly through the bypass passageway 16 which provides less resistance so as to flow into the oil chamber B, whereas a slight amount of oil in the oil chamber A passes through the oil hole 15 in the piston 14 so as to flow into the oil chamber B. Similarly, in a case where the piston 14 moves within the cylinder 12 to the left as viewed in FIG. 3, oil within the oil chamber B passes mainly through the bypass passageway 16 which provides less resistance so as to flow into the oil chamber A, whereas a slight amount of oil in the oil chamber B passes through the oil hole 15 in the piston 14 so as to flow into the oil chamber A. In either of the cases, a damping force generated in the steering damper 10 is small, and when the steering speed remains within the normal range, the rider can perform a smooth steering operation without any resistance.

On the other hand, in the event that the steering speed exceeds the normal range at high running speeds, the sliding speed of the piston 14 within the cylinder 12 increases, and in the event that the differential pressure between the two oil chambers A, B reaches or exceeds a certain value, the check ball 18 is moved by virtue of the differential pressure. For example, in the event that the piston 14 moves within the piston 12 to the right as shown in FIG. 4, since an internal pressure in the oil chamber A increases, the check ball 18 is moved to close the bypass passageway 16 as shown in the drawing, and oil in the oil chamber A passes through only the oil hole 15 having the small diameter which is formed in the piston 14 so as to flow into the oil chamber B. Therefore, a damping force increases drastically which is generated in the steering damper 10 due to the resistance of flowing oil which is generated as the aforesaid check ball movement and oil flow occur. In addition, similarly, in the event that the piston 14 moves within the cylinder 12 to the left as shown in FIG. 5, since the internal pressure of the oil chamber B increases, the check ball 18 is moved to close the bypass passageway 16 as shown in FIG. 5, whereby oil in the oil chamber B passes through only the oil hole 15 having the small diameter which is formed in the piston 14 so as to flow into the oil chamber A. Thus, the damping force increases drastically which is generated in the steering damper 10 due to the resistance of flowing oil which is generated as the aforesaid check ball movement and oil flow occur.

As has been described above, in the event that the steering speed exceeds the normal range due to disturbance from the ground being app to the front wheel system when running at high speeds, since the damping force of the steering damper 10 increases drastically, the disturbance from the ground is absorbed by the damping force that has so increased, so that the vibration of the front wheel system is restrained to thereby secure a high driving stability for the motorcycle 1.

Thus, in the steering damper 10 according to the invention, since the mechanical construction is adopted in which the check ball 18 is moved to close the bypass passageway 16 by the differential pressure as required, the necessity of a sensor or electrical control is obviated, and the vibration of the front wheel system due to disturbance can be suppressed while attempting to reduce the production costs by decreasing the number of components involved and to secure high reliability.

Figure 7:
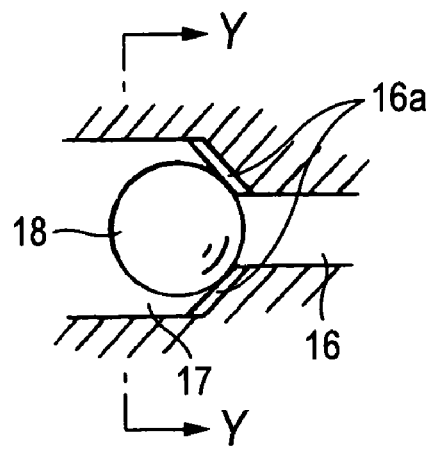
FIG. 7 is a view illustrating in detail an X portion in FIG. 6.
Figure 8:
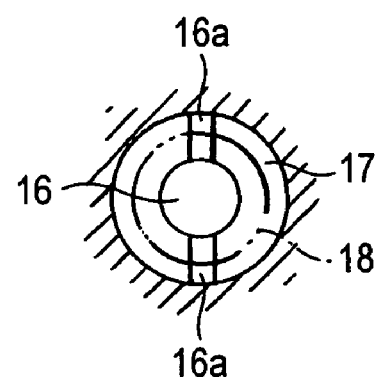
FIG. 8 is a cross-sectional view taken along line Y-Y in FIG. 7.

Here, another embodiment of a steering damper according to the invention will be described below based on FIGS. 6 to 8. Note that FIG. 6 is an explanatory cross-sectional view of a steering damper according to another embodiment of the invention, FIG. 7 is an enlarged view illustrating in detail an X portion shown in FIG. 6, and FIG. 8 is a cross-sectional view taken along line Y-Y in FIG. 7.

Figure 6:
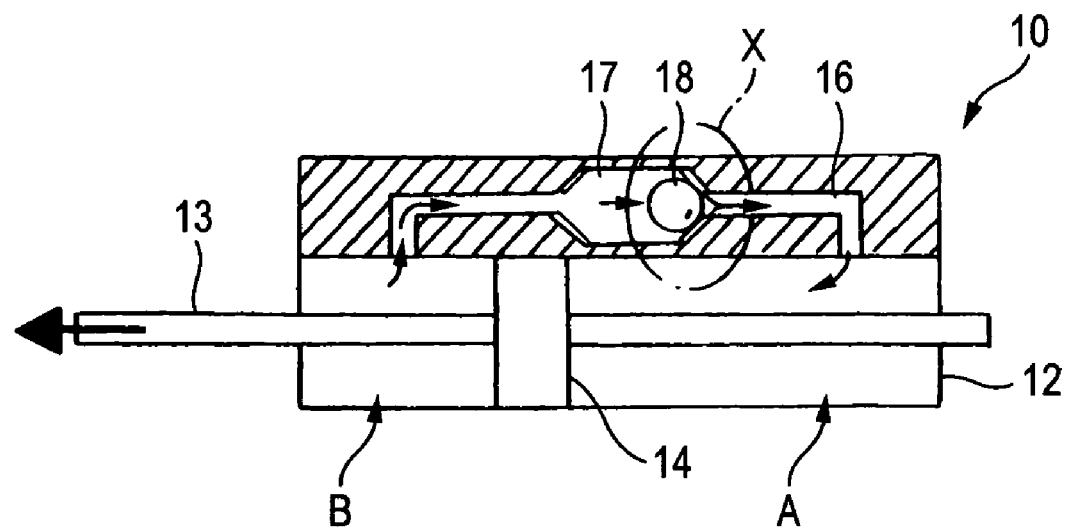

In a steering damper 10 according to the invention, a slit 16*a* is formed in each of a pair of left and right surfaces of a bypass passageway 16 on which a check ball 18 is seated, and in the event that the internal pressure of an oil chamber B is increased due to a leftward movement of a piston 14 within a cylinder 12 as shown in, for example, FIG. 6, whereby the check ball 18 is moved to be brought into abutment with the seating surfaces of the bypass passageway 16, oil within the oil chamber B flows through the bypass passageway 16 and a subsidiary chamber 17 so as to flow from the bypass passageway 16 into the oil chamber A through the slits 16*a*. Therefore, a damping force generated in the steering damper 10 is increased drastically due to the resistance of oil flowing through the slits 16*a*.

Thus, according to the construction, the oil hole 15 (refer to FIGS. 3 and 4) formed in the piston 14 in the previous embodiment can be omitted.

Incidentally, in the event that the check ball 18 is moved to close the bypass passageway 16 by virtue of vibrations, or the inclination of the vehicle body or centrifugal force which takes place or is generated during the cornering while the steering speed remains within the normal range, since there is a possibility that a large damping force is generated in the steering damper 10 as has been described above to thereby interrupt a smooth steering operation, it is desirable to provide a holding device for holding the check ball 18 at a neutral position where the bypass passageway 16 is not closed by the check ball 18 in a state in which a differential pressure between the two oil chambers A, B is smaller than a certain value.

Figure 9:
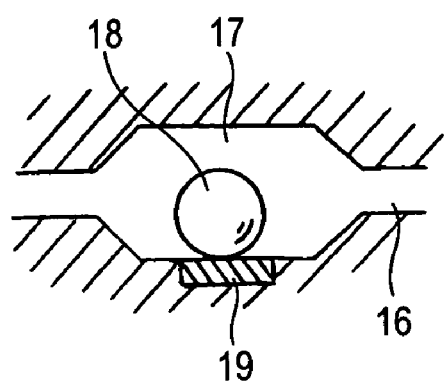
FIG. 9 is a cross-sectional view showing a holding device (a magnet) for holding a check ball at a neutral position.
Figure 10:
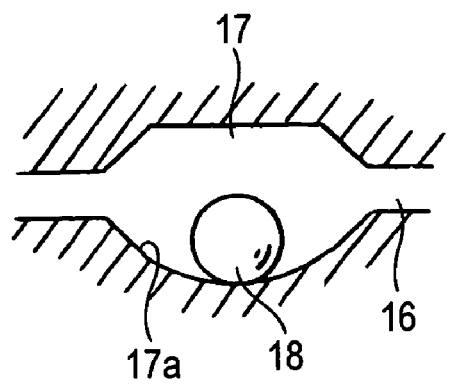
FIG. 10 is a cross-sectional view showing a holding device (a concavely curved surface) for holding the check ball at the neutral position.
Figure 11:
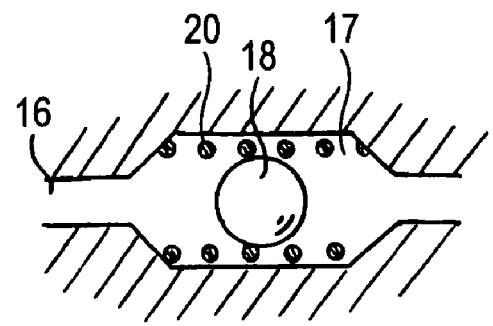
FIG. 11 is a cross-sectional view showing a holding device (a spring) for holding the check ball at the neutral position.

FIGS. 9 to 11 show holding devices in various forms, respectively, in which a holding device shown in FIG. 9 is constructed such that a magnet 19 is embedded in a floor of the subsidiary chamber 17 so that the check ball 18 is held at the neutral position by virtue of the magnetic force of the magnet 19, and a holding device shown in FIG. 10 is constructed such that a concavely curved surface 17*a* is formed on the floor of the subsidiary chamber 17 so that the check ball 18 is held at the neutral position by the curved surface 17*a*.

In addition, a holding device shown in FIG. 11 is constructed such that the check ball 18 is held at the neutral position in the subsidiary chamber 17 by means of a spring 20 which fits on the check ball 18.

Thus, since the check ball 18 is held at the neutral position in the state in which the differential pressure between the two oil chambers A, B is smaller than the certain value by using the holding devices that are shown in FIGS. 9 to 11, there is no case where the check ball 18 moves to close the bypass passageway 16 due to vibration, or the inclination of the vehicle body or centrifugal force which takes place or is generated during the cornering, thereby making it possible to perform a smooth steering operation without any resistance in normal driving conditions.

Figure 12:
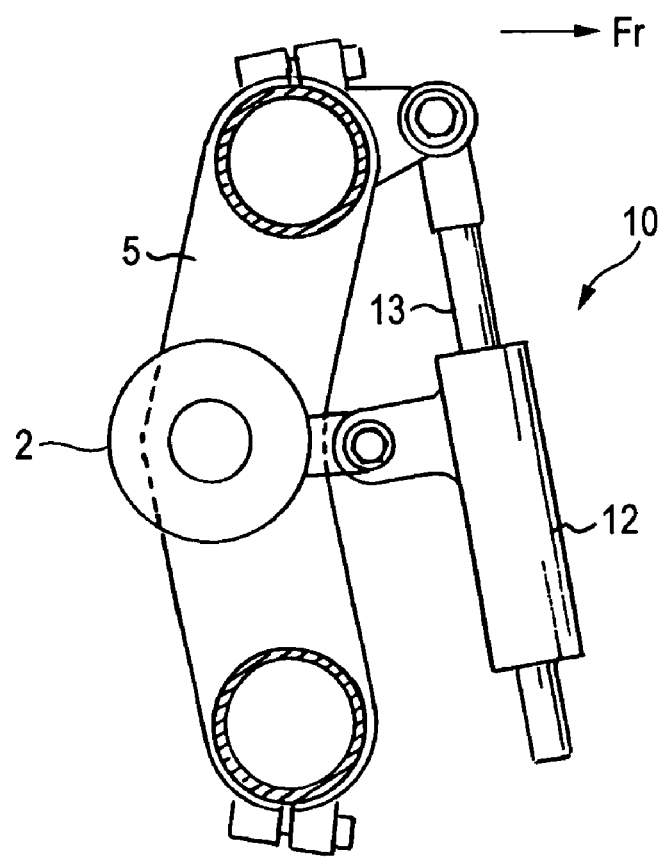
FIG. 12 is a plan view of the motorcycle illustrating another example of arrangement of the steering damper according to the invention.

Note that while the steering damper 10 is arranged in a longitudinal direction of the vehicle body in the aforesaid embodiments, the steering damper 10 may be arranged in a transverse direction of the vehicle body as shown in FIG. 12. In the construction shown in FIG. 12 (in the drawing, an arrow Fr indicates the front of the vehicle body), a piston rod 13 of the steering damper 10 is attached to a lower bracket 5 side, and the cylinder 12 is attached to a head pipe 2 side.

INDUSTRIAL APPLICABILITY

As is clear from the descriptions that have been made heretofore, according to the invention, since there is provided a motorcycle steering damper in which the interior of a cylinder is divided into two oil chambers by a piston which slides in the cylinder as a steering operation takes place, and a passageway for providing a communication between the two oil chambers is provided in a portion other than the piston, characterized in that a subsidiary chamber is defined at an intermediate position along the length of the passageway and in that a check ball is provided in the subsidiary chamber which check ball is adapted to move so as to reduce the cross-sectional area of the passageway when a steering speed exceeds a predetermined value, whereby a differential pressure between the two oil chambers reaches or exceeds a certain value, there can be obtained advantages that a mechanical operation of the steering damper can be ensured while obviating the necessity of a sensor or electrical control and that the vibration of the front wheel system due to disturbance can be suppressed while attempting to reduce the production costs by decreasing the number of components involved and to secure high reliability which results from the entrainment of no delay in control.

The invention claimed is:

1. A motorcycle steering damper in which the interior of a cylinder is divided into two oil chambers by a piston that slides in the cylinder as a steering operation takes place, and a passageway for providing a communication between the two oil chambers is provided in a portion other than the piston, the motorcycle steering damper being characterized in that a subsidiary chamber is defined at an intermediate position along the length of the passageway, and in that a check ball is provided in the subsidiary chamber, the check ball is adapted to move so as to reduce the cross-sectional area of the passageway when a steering speed exceeds a predetermined value and a differential pressure between the two oil chambers reaches or exceeds a certain value; and a magnet is provided which holds the check ball at a neutral position where the passageway is not closed by the check ball in a state in which the differential pressure is smaller than the certain value.

2. A motorcycle steering damper as set forth in claim 1, characterized in that an oil hole is provided in the piston for providing a communication between the two oil chambers.

3. A motorcycle steering damper as set forth in claim 1, characterized in that the magnet is formed on a floor of the subsidiary chamber.

* * * * *